US005712166A

United States Patent [19]

Broan

[11] Patent Number: 5,712,166
[45] Date of Patent: Jan. 27, 1998

[54] METHOD AND MATERIAL FOR THE DETECTION OF IONIZING RADIATION

[75] Inventor: Christopher J. Broan, Preston, United Kingdom

[73] Assignee: British Nuclear Fuels, PLC, Cheshire, United Kingdom

[21] Appl. No.: 647,991

[22] PCT Filed: Dec. 7, 1994

[86] PCT No.: PCT/GB94/02676

§ 371 Date: May 28, 1996

§ 102(e) Date: May 28, 1996

[87] PCT Pub. No.: WO95/16210

PCT Pub. Date: Jun. 15, 1995

[30] Foreign Application Priority Data

Dec. 10, 1993 [GB] United Kingdom ............... 9325364

[51] Int. Cl.$^6$ .................................................. G01N 21/64
[52] U.S. Cl. ........................... 436/58; 436/171; 436/172; 436/902; 422/82.08; 250/390.03; 250/484.5
[58] Field of Search .......................... 436/57, 58, 171, 436/172, 902; 250/370.07, 390.03, 484.5; 422/82.08

[56] References Cited

U.S. PATENT DOCUMENTS

| 2,985,593 | 5/1961 | Broderick et al. |
| 3,789,227 | 1/1974 | Eichner et al. ............... 250/484 |
| 4,594,179 | 6/1986 | Harrah et al. |
| 4,853,548 | 8/1989 | Stevens ................. 250/484.1 |
| 5,441,530 | 8/1995 | Landry et al. ............... 607/88 |

FOREIGN PATENT DOCUMENTS

| A-0 255 479 | 2/1988 | European Pat. Off. |
| A-0 583 475 | 2/1994 | European Pat. Off. |

*Primary Examiner*—Jeffrey Snay
*Attorney, Agent, or Firm*—Oliff & Berridge

[57] ABSTRACT

A method and materials are described for the monitoring of ionizing radiation in a location or on a person. The method comprises providing a fluorescent organic sensor material in the location where monitoring is required, the fluorescent organic sensor material having a molecular structure comprising at least one pair of fluorophore units, the units being held together by a spacer unit such that they are capable of interacting to produce a distinct fluorescence spectrum different from those of the individual fluorophore units; exposing the sensor material to the radiation; and determining any change in the fluorescence spectrum of the sensor material after exposure.

25 Claims, 4 Drawing Sheets

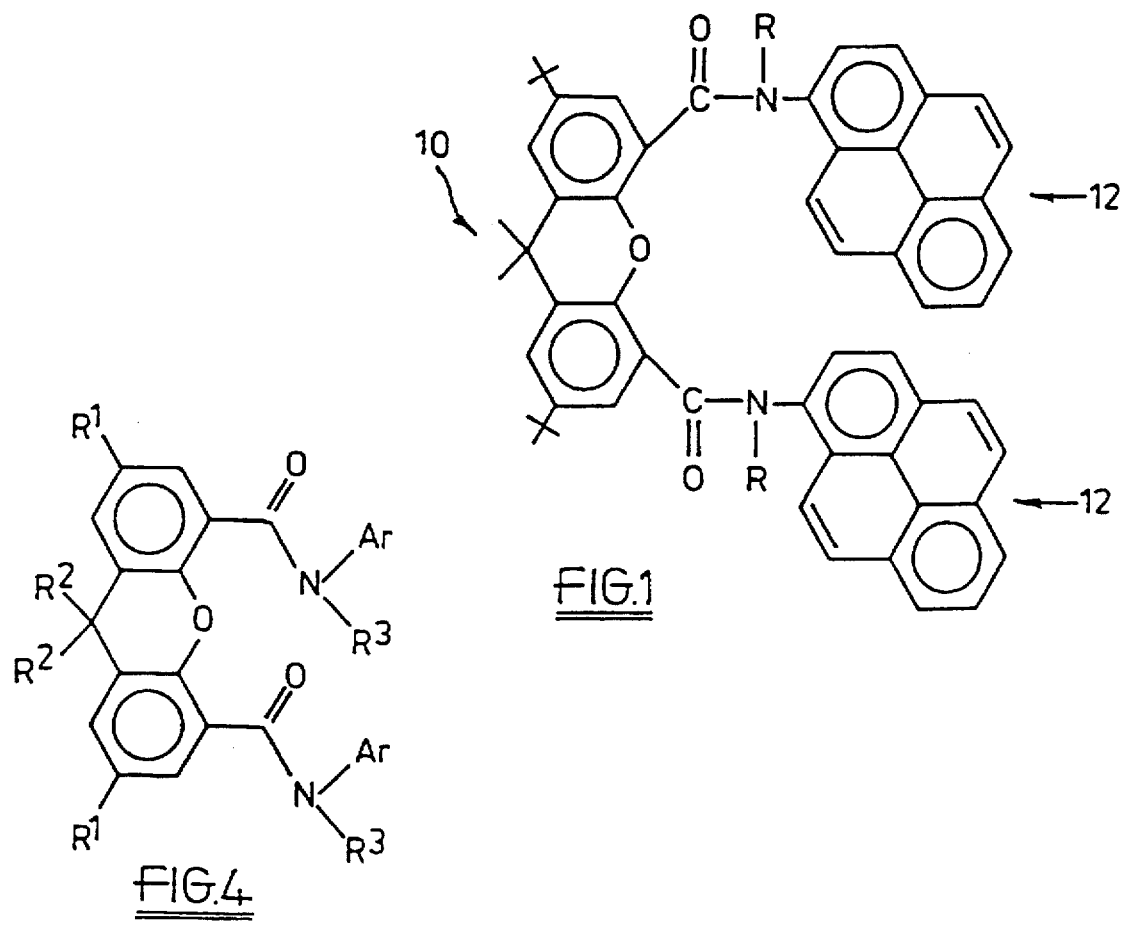
FIG.1
FIG.4
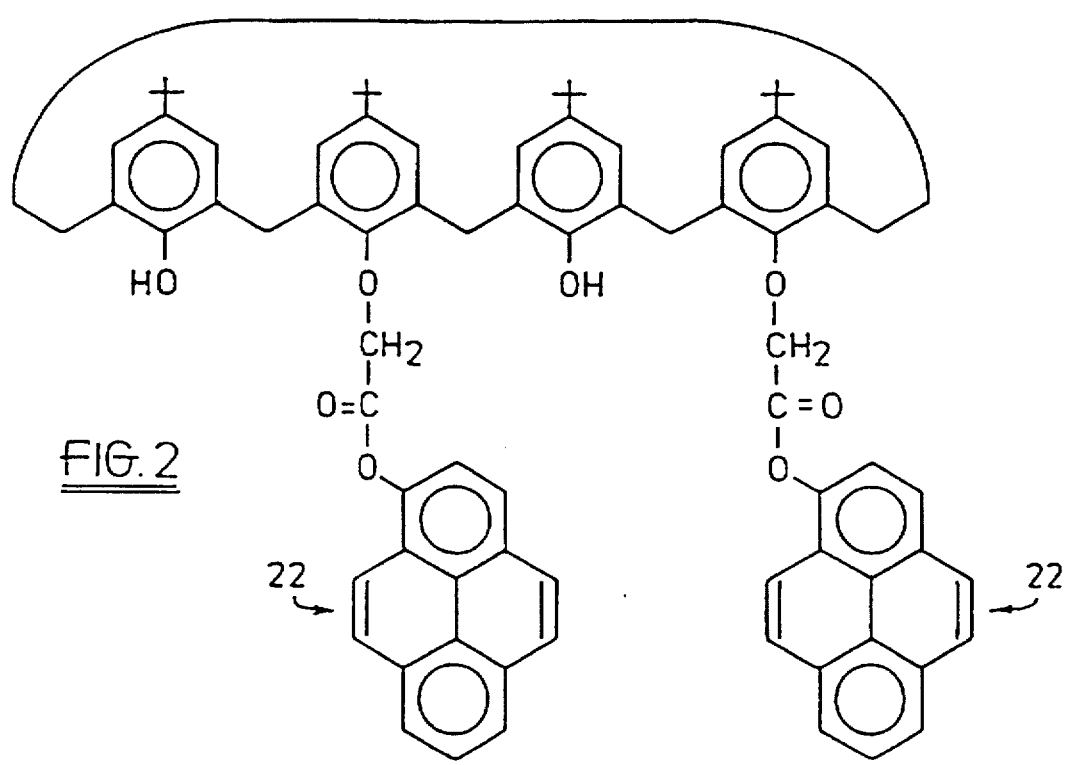
FIG.2

METHOD AND MATERIAL FOR THE DETECTION OF IONIZING RADIATION

The present invention relates to a method and materials for the detection of ionising radiation in which the cumulative dose is obtainable by a non-destructive measurement technique.

Many different methods are presently employed to detect low and intermediate levels of ionising radiation. Some methods such as film badges record the total dose of radiation received by a person over a period of time. However, in order to determine the actual total dose, it is necessary to develop the film in the badge which is thereby effectively destroyed. Further monitoring of the received dose necessitates a fresh film.

According to a first aspect of the present invention there is provided a method of detecting ionising radiation, the method comprising the steps of providing a fluorescent organic sensor material in the location where detecting is required, the fluorescent organic sensor material having a molecular structure comprising at least one pair of fluorophore units, the fluorophore units being held together by a spacer unit such that they are capable of mutually interacting to produce a distinct fluorescent spectrum different from those of the individual fluorophore units; exposing said fluorescent organic sensor material to said ionising radiation; and determining any change in the fluorescent spectrum of said fluorescent organic sensor material after said exposure.

The location where monitoring is required may be on a person who is moving between different physical and/or geographical locations.

According to a second aspect of the present invention there is provided a synthesized organic fluorescent sensor material for use in the detection of ionising radiation, the organic fluorescent sensor material having a molecular structure comprising at least one pair of fluorophore units, the fluorophore units being held together by a spacer unit such that they are capable of interacting to produce a distinct fluorescent spectrum different from those of the individual fluorophore units, said sensor material being susceptible to damage by ionising radiation.

Preferably, said fluorophore units are the same. The fluorescent organic material may be synthesized from a dyestuff or other fluorophore unit material by joining molecules of the fluorophore together by a spacer unit molecule.

Preferably, the spacer unit molecule holds the fluorophore units in a substantially constant relative orientation such that they are capable of interacting to produce an excimer having a fluorescent spectrum characteristic of the synthesized material and different from the fluorescent spectrum of the constituent individual fluorophore units. Because of the relative orientation in which the fluorophore units are held by the spacer unit molecule, they are able to interact through space to change the optical properties of the synthesized molecule from those of the individual fluorophores. The optical properties of the combined fluorophores are distinct and characteristic of the composite molecule including the spacer unit. Therefore, the fluorescent spectrum of the synthesized organic material which has not been exposed to, for example, a source of ionising radiation will have a predictable characteristic fluorescent spectrum.

However, if the synthesized fluorescent organic material is exposed to a source of ionising radiation, damage to the molecule will result particularly, though not necessarily exclusively, through damage to the spacer unit holding the fluorophore units together such that the fluorophore units are allowed to diffuse apart thus changing the fluorescent spectrum of the irradiated material. Alternatively, or in addition to, the sustained damage may be to one or both of the fluorophore units thus changing the fluorescent spectrum of the irradiated material.

Preferably, the spacer unit molecule contains one or more chemical bonds which are particularly prone to damage by radiation. Thus, the individual fluorophore molecules are allowed to diffuse apart when the spacer unit molecule is damaged by radiation.

The fluorescent spectrum of the irradiated material will then contain a portion which is attributable either to the characteristic spectrum of the individual fluorophore units or to the damaged fluorophore units, the portion being different from that of the synthesized material, thus indicating the presence and extent of ionising radiation.

It may be possible to irradiate, for example, a material comprising molecules of a single fluorescent chemical. However, even if damage by radiation were to result in this material, a change to the characteristic fluorescent spectrum would not result, merely a decrease in the intensity of the spectrum would occur. This would cause considerable difficulties in calibration, as intensity level changes can be influenced by many other factors such as adhesion to surfaces for example.

Therefore, the method of the present invention has several advantages which include self-calibration, due to the synthesized fluorescent organic material having a predictable characteristic fluorescent spectrum, and cumulative effect depending on time and level of exposure. Where, for example, the method of the present invention is used in a personal dosimeter badge, the cumulative dose can be measured without the need for the badge to be destroyed. Thus, the true cumulative dose may be measured over a very long period with the same badge.

The synthesized fluorescent organic material may comprise two pairs of fluorophore units in each molecule, the two pairs of fluorophore units being joined to a common spacer unit. However, interaction will generally be between adjacent fluorophore units, and this structure will behave optically in the same manner as a molecule having only one pair of fluorophore units.

Examples of fluorophore unit materials which may be employed include, but are not restricted to, pyrene; anthracene; anthraquinone; napthalene and derivatives thereof, examples of which include 1,8 napthalimide and 1,4,5,8 napthaldiimide. These examples are purely carbon-based aromatic materials. However, the fluorophore units may alternatively comprise heterocyclic compounds, examples of which may include acridine, napthylimide or diimide, dibenzofuran, xanthene, carbazole, phenoxazole, phenothiazine or coumarin.

Examples of spacer unit materials include, but are not restricted to, 4, 5-disubstituted xanthenes; cis-1, 3-disubstituted cyclohexanes and compounds derived therefrom such as 2, 4-disubstituted adamantanes and Kemp's Triacid derivatives and calixarenes and derivatives thereof.

The two fluorophores may also be connected by two or more flexible linking units as in the catenanes or they may be held in close proximity by insertion into a third, hollow 'receptor' molecule such as gamma cyclodextrin by, for example, preferential interaction between fluorophore and receptor compared to fluorophore and solvent or matrix.

The fluorophores may be substituted with atoms or groups which increase their susceptibility to damage by ionising radiation, such as atoms of the halogens.

Spacer unit molecules which do not hold the fluorophore units in a substantially constant relative orientation may be used. Spacer units allowing the fluorophore unit to move between extremes of position relative to each other with time may be used. However, at some point in time the relative positions of the two fluorophore units will be such that mutual interaction will occur to give the characteristic fluorescence spectrum of the excimer. Furthermore, at any one time, the statistical distribution will include a proportion of molecules which will be in such a position that interaction will occur to produce the characteristic excimer fluorescence spectrum. The practical effect of this is that although the predictable characteristic spectrum of the excimer is produced with such synthesized molecules, the proportion of the fluorescent emission corresponding to the excimer is reduced.

Where the detection of neutrons is required, it is advantageous that the synthesized fluorescent material also includes an element having a high neutron capture cross-section such as boron or gadolinium. Neutrons frequently pass through material without leaving any evidence of having done so. Therefore, neutrons may pass through the fluorescent material without causing damage to the molecule. Therefore, the presence of an element having a high neutron capture cross-section causes the neutrons to slow and produce collision decay particles such as $\alpha$–, $\beta$– and $\gamma$– particles which cause the requisite damage to the molecule giving a resultant change in the fluorescent spectrum. Suitable elements may be incorporated in the organic sensor molecule itself, eg in the spacer unit, or in the medium in which the sensor material is itself contained such as in the form of a separate compound in solution with the sensor material for example.

Synthesized organic fluorescent sensor materials may be employed in the form of solid films, solutions or gels. Solid films may be applied by painting or spraying a solution of the material in a volatile solvent onto surfaces of structures, for example, where present or future ionising radiation is suspected. Similarly, gel coatings can be applied by spraying or painting gel solutions or gel solutions in a volatile solvent onto a surface.

Generally, the synthesized organic fluorescent materials described herein may be used in very dilute concentrations. For example, a synthesized material using 1-hydroxypyrene as the fluorophore units and 4, 5 xanthenedicarboxylic acid as the spacer unit has been used in concentrations of about $10^{-5}$ moles/liter.

Determination of the change in the fluorescent properties of the sensor material due to radionuclide damage may be effected by illuminating the irradiated sensor material with ultra-violet light of the appropriate frequency to cause the sensor molecule to fluoresce. The fluorescence spectrum is then analyzed to determine the relative proportions of monomer and excimer.

Examples of applications where this method and material according to the present invention may be used include:

1) the classification of radioactive waste into high, medium or low level waste by, for example, immersion in a solution of the sensor material for a given time followed by determination of the change in the fluorescence spectrum;

2) use in personal dosimeters from which the cumulative dose may be measured in a simple manner without damage or the need for development of film as with conventional devices, allowing repeated re-use of the dosimeter;

3) the determination of the position and degree of surface contamination during decommissioning;

4) as a neutron sensor or dosimeter when used in combination with a compound containing or itself containing boron or an element having a high neutron capture cross-section; and 5) as the active component in a sensor used to verify that a sufficient radiation dose has been applied in applications such as the sterilisation of medical instruments or radiation treatment of foodstuffs.

The above are merely examples of the wide range of applications of the present invention in its widest sense and are not exhaustive.

In order that the present invention may be more fully understood, examples will now be described by way of illustration only with reference to the accompanying drawings, of which:

FIG. 1 shows the structure of a first embodiment of a sensor material according to the present invention;

FIG. 2 shows the structure of a second embodiment of a sensor material according to the present invention;

FIG. 4 shows the structure of a third embodiment of a sensor material according to the present invention;

Figure 3:
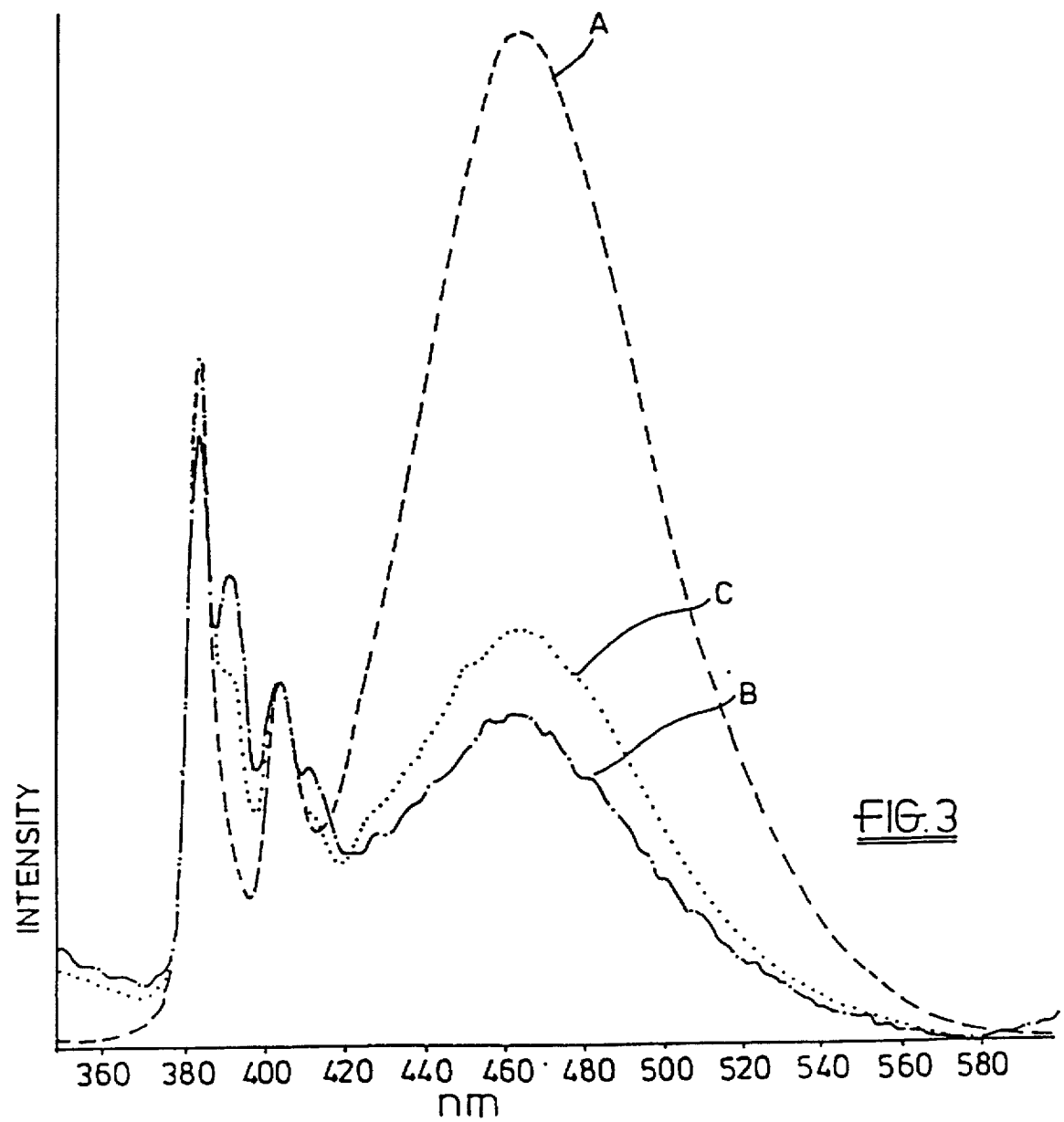
FIG. 3 shows a plot of the change in the fluorescence spectrum of the sensor material of FIG. 2 after a period of irradiation.

Referring now to FIG. 1 and where the fluorophore units 12 shown in the molecule comprise 1-aminopyrene. The compound shown in FIG. 1 may be synthesized by the following method. 2, 7-di(t-butyl)-9, 9-dimethyl-4, 5-xanthenedicarboxylic acid (0.41 g) is placed in dichloromethane (50 ml); a large excess of thionyl chloride (1 ml) is added and the mixture refluxed for three hours. The solvent and reagent are distilled off at reduced pressure (10 mm Hg) and the last traces removed under vacuum (0.01 mm Hg). The bis(acid chloride) thus prepared is placed in dry tetrahydrofuran (25 ml) in which is dissolved 1-aminopyrene (0,45 g). Pyridine (10 ml) is added and the reaction allowed to proceed at room temperature for 3 days. The solvents are distilled off at reduced pressure (10 mm Hg) and the last traces removed under vacuum (0.01 mm Hg). The crude material is taken up in dichloromethane (25 ml) and washed with dilute hydrochloric acid (0.1M, 2 lots each of 25 ml), the solution is dried with magnesium sulphate and the solvent removed under reduced pressure. Extensive recrystallisation from distilled petroleum ether (40°–60° C.) yields the pure bis(1-pyreneamide) compound which may be characterised by known spectroscopic and chromatographic methods. The spacer unit molecule is indicated at 10 whilst the fluorophore unit molecules are indicated at 12.

In this material the fluorophore units 12 are held by the spacer unit 10 in an orientation whereby they can interact to produce a fluorescence spectrum characteristic of the new synthesized material.

Referring now to FIGS. 2 and 3 and where the fluorophore units 22 shown in the molecule comprise 1-hydroxypyrene. The compound shown in FIG. 2 may be synthesised by the following method. 4-tert-butylcalix(4)arene (1.95 g), potassium carbonate (1.38 g oven dried at 120° C.) and 2-chloroacetamide are placed in dry THF(50ml) and refluxed under nitrogen for 2 days. The solvent is distilled off under reduced pressure and the product is taken up in dichloromethane. The inorganic solids are filtered off and discarded and the organic component purified by column chromatography on silica eluting with dichloromethane. The diamide compound thus prepared, is hydrolysed to the diacid by reflux for 2 hours in 50 ml of a mixture of equal volumes of ethanol and 20% aqueous sodium hydroxide solution. The resulting diacid (0.70 g), 1-hydroxypyrene (0.80 g), dimethylaminopyridine (0.05 g) and dicyclohexylcarbodiimide (DCC1)(0.6 g) are placed in dry toluene and stirred for 2 days at room temperature. Aqueous acetic acid is added to consume the excess DCC1, the solids are filtered off, the phases separated and the organic phase washed successively with dilute hydrochloric acid and sodium hydrogen carbonate solutions. The solution is dried with magnesium sulphate and the solvent distilled off. The required compound is purified by chromatography on a silica column eluting with petroleum/ethyl acetate (8:1).

A solution of the material as made by the method described above was made with petrol to a concentration of $10^{-5}$ moles/liter and placed in a vial next to a cobalt -60 gamma-source for 200 hours. The fluorescence spectrum before and after exposure is shown in FIG. 3. FIG. 3 shows intensity against emitted wavelength. The portion which has changed lies approximately between the wavelengths 410 to 560 nm. The spectrum of the unirradiated synthesized fluorescent sensor material is shown by the curve at 'A', whereas the curve at 'B' represents the fluorescence spectrum of the sensor material after irradiation for the maximum time. The curve at 'C' shows the fluorescence spectrum after irradiation for an intermediate time. The curve at 'A' is indication of a radiation close of O Sieverts (Sv); the curve at 'B' of a total dose of 0.25 Sv and that at 'C' of a total dose of 0.11 Sv.

FIG. 4 shows the structure of a generalised second embodiment of a synthesized fluorescent sensor molecule according to the present invention wherein the radicals may be chosen as follows: R1, tert-butyl; $R^2$, methyl; $R^3$, ethyl or proton; and Ar, 1-pyrene or 1-anthracene, the Ar group being the fluorophore unit molecule.

Figure 5:
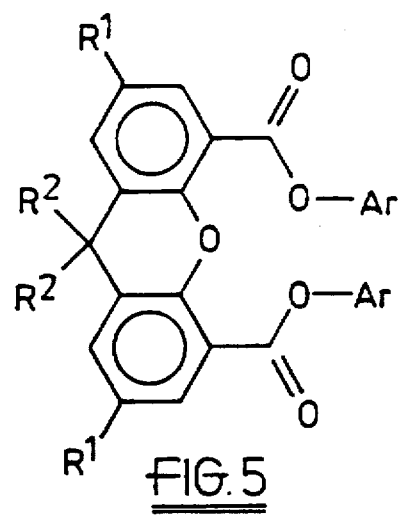
FIG. 5 shows the structure of a fourth embodiment of a sensor material according to the present invention.

FIG. 5 shows another embodiment wherein the radical groups are: $R^1$, tert-butyl; $R^2$, methyl; and Ar, 1-pyrene.

Figure 6:
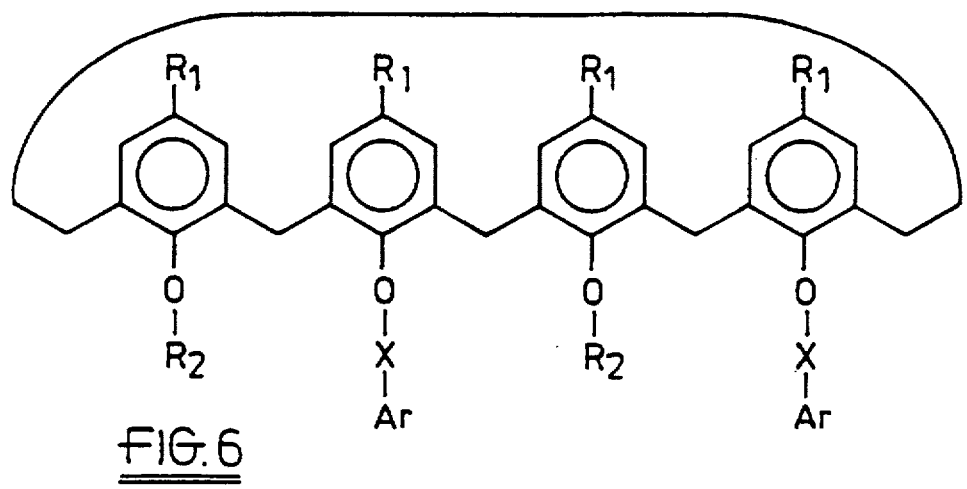
FIG. 6 shows a fifth embodiment of a sensor material according to the present invention.

FIG. 6 shows an embodiment of the calixarene linked molecule where the radical groups R1 and R2 may correspond to protons or alkyl radicals, the groups X may correspond to alkyl chains, alkyl ethers or thioethers, ester or amide linkages or any combination thereof and the group Ar to the aforementioned fluorophores.

Figure 7:
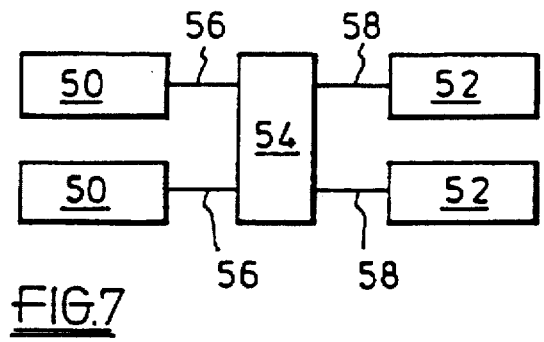
FIG. 7 shows a schematic representation of the structure of a sixth embodiment of a sensor material according to the present invention.

FIG. 7 shows a schematic representation of a synthesized fluorescent sensor molecule wherein there are two pairs of fluorophore unit molecules 50, 52 combined with the spacer molecule 54. In practice, only the pairs of molecules 50 and 52 would interact, there being no interaction between molecules 50 and 52. Therefore, the fluorescence spectrum of the complete molecule shown in FIG. 5 would be substantially the same as that if there were only one pair of molecules 50 or 52 combined with the spacer molecule 54. Damage to either of the bonds 56 or 58 would result in the fluorescence spectrum of the fluorophore units 50 or 52 becoming apparent on analysis.

Figure 8:
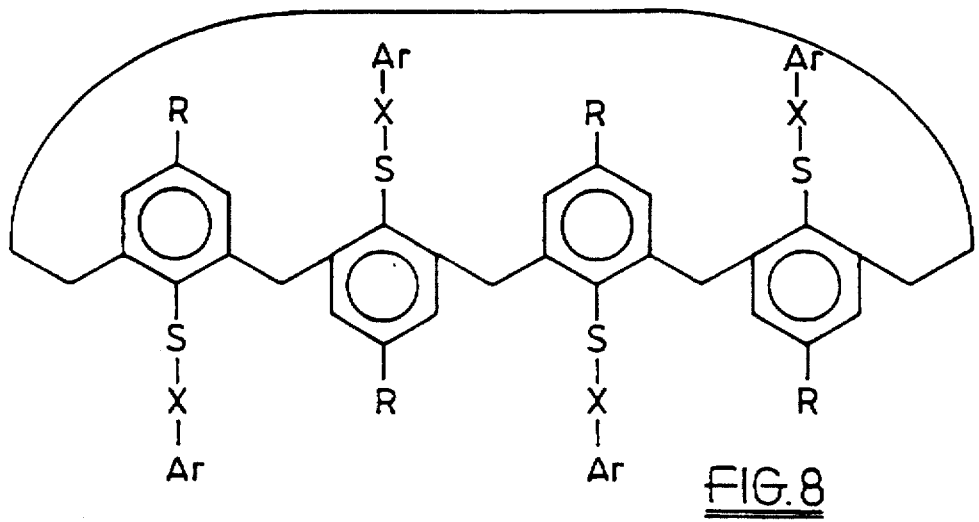
FIG. 8 which shows the structure of a seventh embodiment of a sensor molecule having two pairs of fluorophore units.

FIG. 8 shows an embodiment of a molecule with two pairs of fluorophores where the radicals may be chosen from proton, tert-butyl or other alkyl radicals and the groups X are defined as above with reference to FIG. 6.

Figure 9:
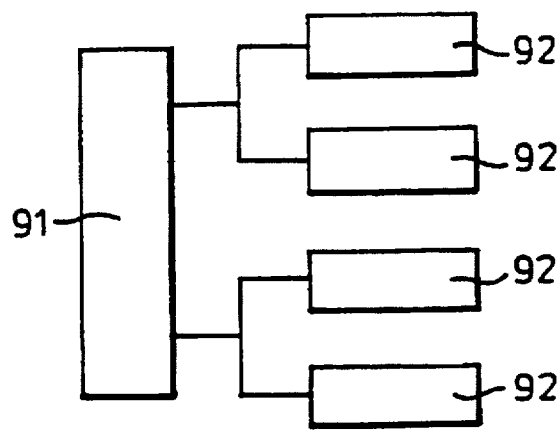
FIGS. 9 and 10 show representations of a fluorescent sensor molecule which includes two pair of fluorophore units.
Figure 10:
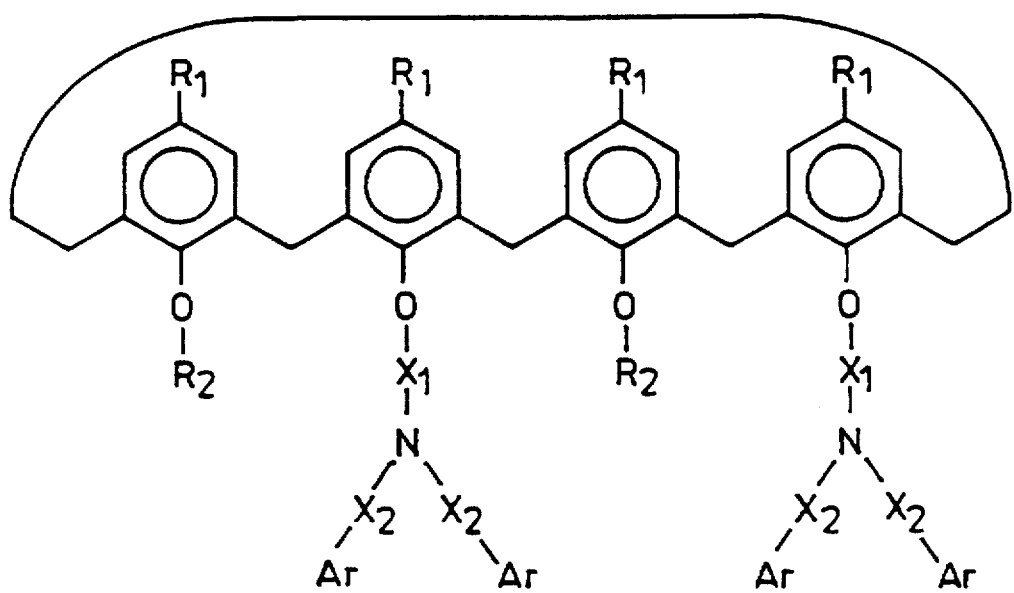

FIG. 9 shows a schematic representation of a fluorescent sensor molecule where two pairs of fluorophore units 92 are attached to the spacer 91. In practice, the individual molecules of one pair will interact substantially only with the corresponding molecule of the other pair. Therefore, the fluorescence spectrum of the complete molecule shown in FIG. 9 would be substantially the same as if there were only one fluorescent unit 92 attached to each site of spacer 91. FIG. 10 shows an embodiment of this concept where $R_1$, $R_2$, Ar, $X_1$ and $X_2$ may be as defined as above.

I claim:

1. A method of detecting ionizing radiation, the method comprising the steps of providing a fluorescent organic sensor material in the location where detecting is required, the fluorescent organic sensor material having a molecular structure comprising at least one pair of fluorophore units, the fluorophore units being held together by a spacer unit such that they are capable of interacting to produce a distinct fluorescence spectrum different from those of the individual fluorophore units, said distinct spectrum being responsive to said ionizing radiation; exposing said fluorescent organic sensor material to said radiation; and determining any change in the fluorescence spectrum of said fluorescent organic sensor material after said exposure.

2. A method according to claim 1 wherein the fluorescent sensor material is employed in a form chosen from the group consisting of a solid film, a solution, and a gel.

3. A method according to claim 1 wherein the fluorescent sensor material is provided in the form of a personal dosimeter.

4. A method according to claim 1 wherein the fluorescent sensor material is used for the classification of radioactive waste into low, medium or high level.

5. A method according to claim 4 wherein the radioactive waste is immersed in the sensor material.

6. A method according to claim 1 wherein the fluorescent sensor material is used for the determination of position and degree of surface contamination during decommissioning.

7. A method according to claim 1 wherein the fluorescent sensor material is used to verify an applied radiation dose.

8. A method according to claim 7 wherein the dose verification is in radiosterilization of medical equipment or preparation of irradiated foodstuffs.

9. A method according to claim 1 wherein the fluorescent sensor material is used as a neutron detector.

10. A synthesized organic fluorescent sensor material for use in the detection of ionizing radiation, the organic fluorescent material having a molecular structure comprising at least one pair of fluorophore unit molecules, the fluorophore units being held together by a spacer unit molecule such that the fluorophore unit molecules are capable of interacting to produce a distinct fluorescence spectrum different from that of the individual fluorophore units, said sensor material being susceptible to damage from ionizing radiation.

11. An organic sensor material according to claim 10 wherein said fluorophore units are the same.

12. An organic sensor material according to claim 10 wherein the fluorophore unit molecules are dyestuffs.

13. An organic sensor material according to claim 10 wherein the spacer unit molecule possesses one or more chemical bonds particularly prone to damage by radiation.

14. An organic sensor material according to claim 10 wherein the sensor material molecule comprises two pairs of fluorophore units in each molecule, each pair being bonded to a common spacer unit.

15. An organic sensor material according to claim 10 wherein the fluorophore unit is chosen from the group consisting of pyrene, anthracene, anthraquinone, napthalene and derivatives thereof.

16. An organic sensor material according to claim 10 wherein the fluorophore units are heterocyclic compounds.

17. An organic sensor material according to claim 16 wherein the fluorophore units are selected from the group consisting of acridine, napthylimide or diimide, dibenzofuran, xanthene, carbazole, phenoxazole, phenothiazine and coumarin.

18. An organic sensor material according to claim 10 wherein the spacer unit is chosen from the group consisting of 4,5-disubstituted xanthenes, cis-1,3-disubstituted cyclohexanes and compounds derived therefrom.

19. An organic sensor material according to claim 10 wherein the fluorophores are linked by two or more flexible chains.

20. An organic sensor material according to claim 19 wherein the flexible chains are catenanes.

21. An organic sensor material according to claim 10 wherein the spacer unit holds the fluorophore units in a substantially constant relative orientation.

22. An organic sensor material according to claim 10 wherein the sensor material is contained in a solvent medium to produce a solution or a gel.

23. An organic sensor material according to claim 10 wherein the molecule further includes an element having a high neutron capture cross section.

24. An organic sensor material according to claim 22 wherein the medium in which the sensor material is contained includes an element having a high neutron capture cross section.

25. An organic sensor material according to claim 23 wherein the element is either boron or gadolinium.

* * * * *